United States Patent [19]

Humpfer et al.

[11] Patent Number: 4,726,255
[45] Date of Patent: Feb. 23, 1988

[54] POWER TRANSMISSION SYSTEM FOR DRIVING A VARIABLE SPEED PROCESSING MACHINE

[75] Inventors: Rudolf Humpfer, Satteldorf; Georg Wahl, Crailsheim, both of Fed. Rep. of Germany

[73] Assignee: J. M. Voith Turbo GmbH & Co. KG, Fed. Rep. of Germany

[21] Appl. No.: 80,207

[22] Filed: Jul. 30, 1987

Related U.S. Application Data

[63] Continuation of Ser. No. 797,237, Nov. 12, 1985, abandoned.

[30] Foreign Application Priority Data

Nov. 16, 1984 [DE] Fed. Rep. of Germany ....... 3441877

[51] Int. Cl.⁴ .................... F16H 47/10; F16H 47/04
[52] U.S. Cl. ...................................... 74/688; 74/677; 74/684; 74/718
[58] Field of Search ............... 74/677, 688, 718, 720, 74/730, 782, 681; 60/363

[56] References Cited

U.S. PATENT DOCUMENTS

| | | | |
|---|---|---|---|
| 2,968,197 | 1/1961 | DeLorean | 74/677 |
| 3,023,637 | 3/1962 | DeLorean | 74/688 |
| 3,025,721 | 3/1962 | DeLorean | 74/688 |
| 3,246,542 | 4/1966 | Moan | 74/688 |
| 3,295,392 | 1/1967 | Sheiter | 74/688 |
| 3,355,967 | 12/1967 | Moan | 74/688 |
| 3,500,704 | 3/1970 | Muller et al. | 74/677 |
| 3,543,607 | 12/1970 | Schmidt et al. | 74/688 |
| 3,592,079 | 7/1971 | Mori | 74/688 |
| 3,601,211 | 8/1971 | Finke | 74/710.5 |
| 4,281,564 | 8/1981 | Hill | 74/677 |

FOREIGN PATENT DOCUMENTS

| | | | |
|---|---|---|---|
| 275988 | 11/1969 | Austria. | |
| 1500520 | 5/1969 | Fed. Rep. of Germany. | |
| 1355090 | 2/1964 | France | 74/720 |
| 1208831 | 10/1970 | United Kingdom. | |

Primary Examiner—Rodney H. Bonck
Assistant Examiner—David A. Testardi
Attorney, Agent, or Firm—St. Onge Steward Johnston & Reens

[57] ABSTRACT

A power transmission system serves to drive a variable-speed processing machine normally in a lower speed range and if necessary in an upper speed range. The system essentially comprises the following elements which are all disposed coaxially to one another: An input shaft connected by means of a hydrodynamic adjustable coupling to an intermediate shaft to rotate the impeller pump of an adjustable hydrodynamic torque converter. Its turbine wheel rotates with a brakable override shaft. The intermediate shaft and the override shaft are connected to an output shaft by means of a differential gear.

12 Claims, 5 Drawing Figures

POWER TRANSMISSION SYSTEM FOR DRIVING A VARIABLE SPEED PROCESSING MACHINE

This is a continuation of co-pending application Ser. No. 797,237 filed on Nov. 12, 1985, now abandoned.

This invention generally relates to a power transmission system for driving a variable-speed processing machine.

A power transmission system is known from Austrian Patent Schrift No. 275 988, FIGS. 2 or 4 (see Great Britain Pat. No. 1,208,831). It serves by way of an output shaft to drive a processing machine, the rotational speed of which is to be variable in a certain range, which can be greater or smaller relative to a basic speed. An essential element of the system is a differential (epicyclic) gear having three gear components, one of which is coupled to a brakable override shaft and to the turbine wheel of a hydrodynamic torque converter. The operation of the shaft is superimposed on the output shaft. The processing machine to be driven is generally a fluid flow engine, e.g., a turbo-compressor or rotary pump, in particular a boiler-water feed pump.

According to FIG. 2 of the Austrian Publication, the following is provided: In a lower operating rotational speed range power transmission to the output shaft occurs just through a hydrodynamic coupling and through first and second gear components of the differential gear. In this operating condition the overriding shaft is braked and the torque converter is switched off, i.e., emptied. The rotational speed of the processing machine can be altered by varying the degree of admission or filling of fluid to the coupling. In parallel to the hydrodynamic coupling a lock-up or by-pass coupling is provided, to drive the processing machine at the uppermost limit of the loewr range of the operating rotational speed.

If the processing machine is to be driven at an increased rotatioal speed (i.e., within an upper rotational speed range), then the hydrodynamic torque converter is switched on by filling it with fluid and the brake operative on the overriding shaft is released. With such action a part of the input drive power is branched off and transmitted via the torque converter and the third gear component of the differential gear to the output drive shaft. This may be referred to as the "overriding or superimposition branch". In order to enable variation of the rotational speed in this operating state, an adjustable converter is provided, preferably a torque converter having variable guide blades.

In the overriding branch a torque converter (and not a coupling) has to be provided, because only this is in the position to transmit the high torque of the overriding shaft at the upper rotational speed range with tolerable losses and a reasonable capital investment.

The type of construction known from FIG. 4 of the Austrian Publication works without a hydrodynamic coupling at a lower fixed speed and with the overriding shaft stationary. In an upper rotational speed range it is again possible to vary the output shaft rotational speed by means of controllable converter. In the embodiments described in the Austrian Publication as well as in the embodiments of this application the rotational speed of the input drive machine is substantially or completely constant.

In the known types of power transmissions the pump impeller of the adjustable converter is connected to the override shaft via several gear wheels and laterally displaced shaft. Similarly the turbine wheel of the adjustable converter is connected via a laterally displaced shaft and gear wheels to one of the differential gear components. This construction has a tendency to introduce dangerous vibrations in the power transmission because of the need for gear wheels. In addition, a plurality of bearings and a relatively large housing are necessary so that the system as a whole is very expensive to produce and high losses are caused in the bearings.

It is, therefore, an object of the invention to provide a compact, low-vibration power transmission system in which an input shaft is coupled, either directly or indirectly, to a first gear component of a three-gear component differential gear system having a second-gear component coupled to an output shaft and with the input shaft further being coupled to the output shaft via, an input of a fluid fillable and emptiable as well as adjustable torque converter, a turbine wheel thereof, an override shaft and a third-gear component of the differential gear system. With a power transmission system in accordance with the invention power losses are reduced at lower costs.

With a power transmission system in accordance with the invention system elements, such as the input, output and override shafts, the differential gear, the hydrodynamic torque converter and, if necessary, a hydrodynamic coupling are coaxially disposed with respect to one another. In such system gear wheels and bearings associated with a displaced override shaft are deleted.

When in a power transmission system of this invention, the maximum rotational output speed is approximately the same as or only slightly greater than the input rotational speed, no other gear wheels are required apart from the differential gears. In other applications, however, a higher overall reduction ratio is required so that a gear, normally a reduction gear, is disposed between the torque converter and the differential gear system. As further described herein, such gear can be in the form of a constant ratio planetary gear that can also be coaxially disposed with respect to the remaining system elements.

A coaxial arrangement of all system elements is in fact already known from German Patent Application Publication DE-OS No. 15 00 520. However, this publication describes a power transmission system of another type in which the entire output to be transmitted has to be passed through an additional hydrodynamic power transmission unit (i.e., a coupling or converter) in an upper rotational speed range, while at a lower rotational speed range the unit is switched off by emptying the fluid. Such additional power transmission unit requires a high capital expenditure.

With a power transmission system in accordance with the invention a smaller additional hydrodynamic torque converter is needed because it only regulates a small part of the total output transmitted in the upper rotational speed range. The main part of the total output is transmitted along the normal power path the same as before. Since a relatively small converter is needed with a power transmission system of this invention, the converter's relatively poor efficiency reduces the total efficiency only slightly.

The differential gear system preferably is constructed as an epicyclic gearing, as is well known. The sun wheel, satellite or planet carrier and annular gear wheel of the epicyclic gearing can be connected in different ways to the remaining system, elements depending on each individual case.

The brake for suppressing the operation of the override shaft can be a freewheeling arrangement or a mechanical brake in a manner well known in the art. However, in a preferred form of the invention the brake is a hydrodynamic brake. As is well known, such brake is switched on or off by filling or emptying it of fluid. The rotor speed of a hydrodynamic brake is determined by the braking torque and by the fluid filling degree. Generally, a fluid brake is traversed by a fluid flow to remove heat. Assuming there is a certain constant filling degree, the amount of fluid flowing through the brake may change to, for example, improve heat removal for which a higher fluid flow may be needed.

In order to achieve a certain speed of the override shaft in a power transmission in accordance with the invention, the filling degree of the fluid brake is to be controlled (adjusted between zero and a hundred percent). For this there is no need to adjust the fluid flow admitted to the brake, only an outlet valve is to be adjusted. Hence, by controlling the degree of fluid filling or the admission of fluid to the hydrodynamic brake rotational speeds can be advantageously set at the override shaft.

As is well known, a free-wheeling arrangement could be used instead of a brake but in such case a backwards rotation of the override shaft is prohibited. When a mechanical brake is used backwards rotation of the override shaft is possible in theory, but the detrimental effects of wear normally encountered with mechanical brakes should be taken into account. On the other hand, the use of a hydrodynamic or fluid brake in a power transmission system of this invention enables the override shaft to rotate backwards in a continuous operation at a relatively low speed without any wear and with the following advantages being achieved:

1. If there is no hydrodynamic coupling in a system in accordance with FIG. 4 of the Austrian Publication, the output rotational speed can be varied by the already mentioned control of fluid filling degree of the brake.
2. If there is a gear, preferably a constant ratio planetary gearing, in the branch that includes the override shaft (between the torque converter and the differential gear), the disadvantage arising with known power transmission system when the gear wheels of constant ratio gearing are stationary at the lower operating rotational speed range (i.e., when the converter is switched off) is avoided. Such a stoppage can result in so-called position marks or flat spots being formed on the gear wheels and on the bearings of the constant ratio gearing during a continuous operation under load.
3. If a hydrodynamic coupling is provided then its slip can be adjusted to a smaller value—in the case of a transmission of power through the hydrodynamic coupling in the lower speed range—so that the losses in the hydrodynamic coupling are smaller in continuous operation. In particular it is possible to drive the coupling with a maximum degree of filling fluid admission so that the circulation of fluid through an external circulation can be eliminated with an avoidance of power.
4. If a hydrodynamic coupling having a by-pass coupling is provided, a partial emptying of the brake can simultaneously be triggered with the engaging of the by-pass coupling so that a sudden increase in torque thrust associated therewith is avoided.

A hydrodynamic brake can also be used in the following power transmission systems:
1. With the types of power transmission systems known from the above identified Austrian Publication, the free-wheeling arrangement or the mechanical brake is replaced by a hydrodynamic brake.
2. If a smaller variable-speed, preferably electric, motor is also disposed coaxially with respect to the remaining system elements and is used to drive the override shaft instead of the hydrodynamic torque converter, the override shaft can also be braked by means of a hydrodynamic brake so that the variation in the output rotational speed is not only possible in the upper rotational speed range, but also in the lower speed range.
3. It is also conceivable, for example, that a multi-speed electric motor (e.g., a pole changing motor) is provided as the main prime mover and that apart from this only one differential gear having a hydrodynamic brake is provided. In this case in the rotational speed ranges lying between the rotational speeds of the electric motor, the output rotational speed can again be varied by means of the hydrodynamic brake.

Certainly, from German Patent Application Publication DE-OS No. 31 44 902 corresponding to copending and commonly owned U.S. patent application Ser. No. 852,372, filed on Apr. 16, 1986, now U.S. Pat. No. 4,699,022, the use of a hydrodynamic brake for braking (or retarding) a gear component of a differential gear is already known. However, this latter application concerns a speed changing gear in which the hydrodynamic brake is used to shift the drive shaft of the gear from standstill into rotation, after which the rotor of the hydrodynamic brake is arrested by means of a mechanical brake.

BRIEF DESCRIPTION OF DRAWINGS

Other advantages and objects of the invention can be understood from the following description of several embodiments described in conjunction with the drawings.

DETAILED DESCRIPTION OF DRAWINGS

In all figures system elements having the same function are given the same reference numbers as follows:
- 10 is an input shaft,
- 11 is a hydrodynamic coupling,
- 12 is an intermediate shaft,
- 13 is a differential gear (i.e., an epicyclic gear),
- 14 is an output shaft,
- 15 is a hydrodynamic torque converter (preferably constructed as an adjustable converter),
- 16 is an override shaft,
- 17 is a brake (in FIGS. 1 to 3: a hydrodynamic brake, in FIGS. 4 and 5: a mechanical brake).

Figure 1:
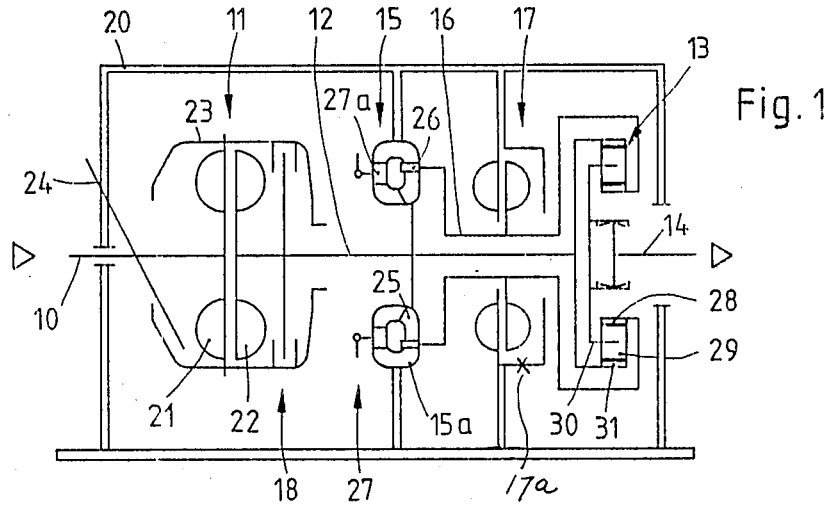
FIGS. 1 to 5 are each simplified schematic representations of longitudinal sections of different power transmission system in accordance with the invention.
Figure 2:
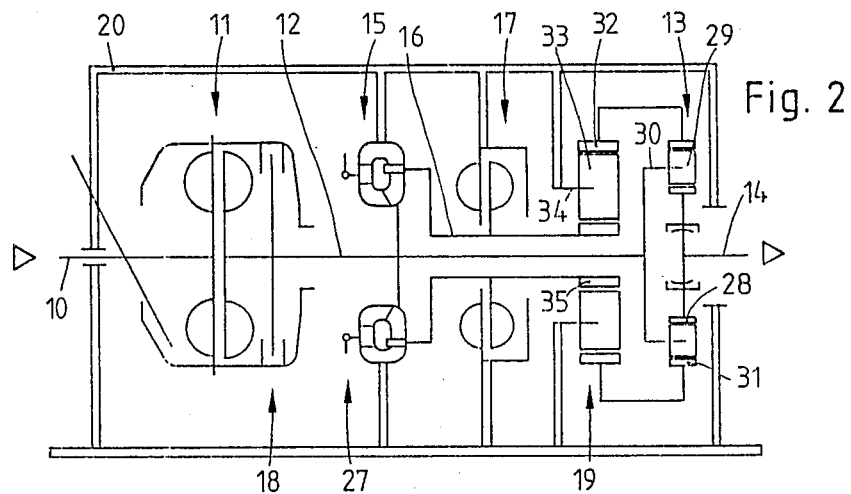
Figure 3:
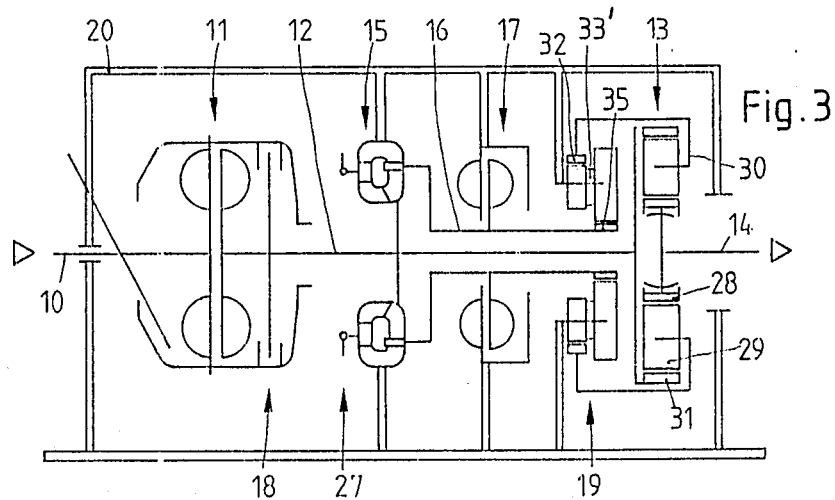

In FIGS. 1 to 3 a lock-up or by-pass coupling 18 is disposed parallel to the hydrodynamic coupling 11. In FIGS. 2 and 3 a constant ratio planetary gearing 19 is placed between the adjustable converter 15 and the differential gear 13. A system housing is designated by 20 in all figures.

Figure 4:
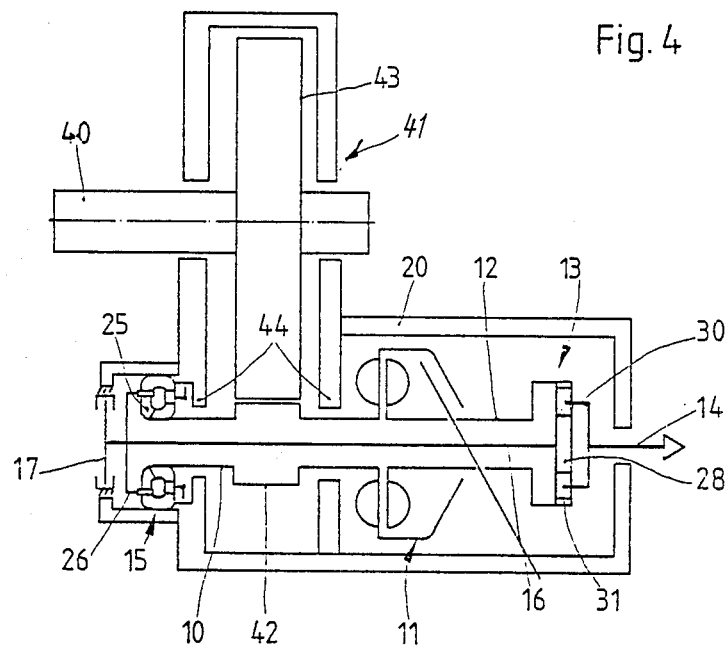
Figure 5:
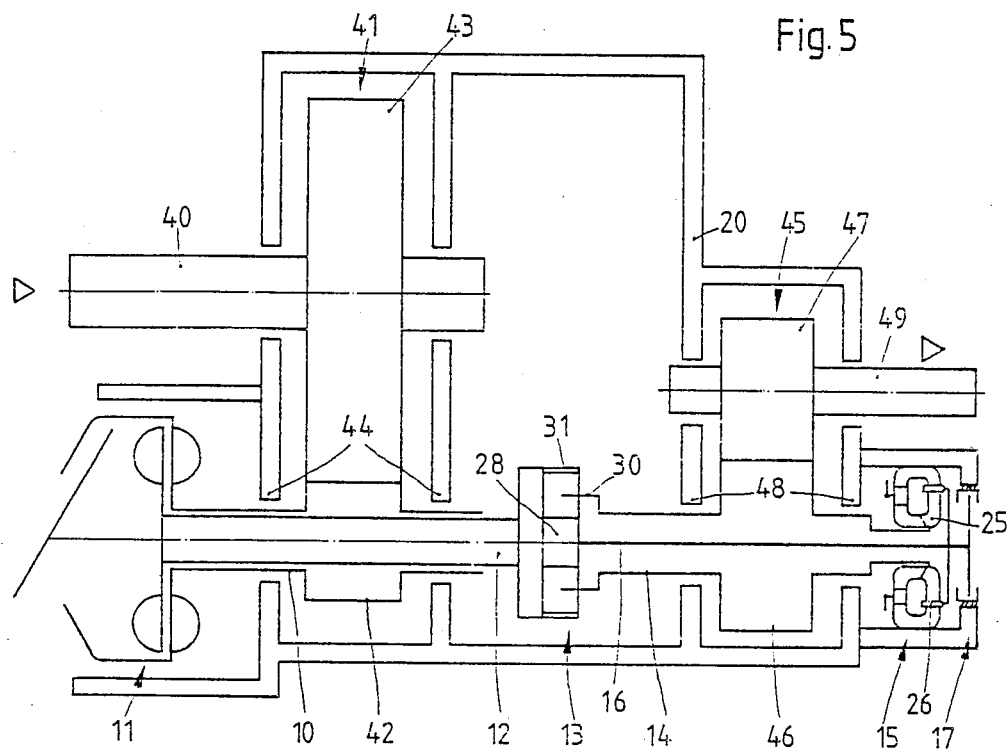

The following individual parts are again present in all embodiments, but only in FIG. 1 partly provided with reference numbers:
21 is a primary blade wheel of the hydrodynamic coupling 11 and rotates with the input shaft 10,
22 is a secondary blade wheel for the coupling 11 and rotates with the intermediate shaft 12,
23 is a coupling shell that rotates with the input shaft 10,
24 is a mobile scoop pipe of the coupling 11,
25 is a pump impeller of the adjustable converter 15 and rotates in FIGS. 1-3 with the intermediate shaft 12, in FIG. 4 with the input shaft 10 and in FIG. 5 with the output shaft 14,
26 is a turbine wheel of the adjustable converter 15 and rotates with the override shaft 16,
27 is an adjustment device for the tilting guide blades 27a of the adjustable converter 15,
28 is a sun wheel of the differential gear 13,
29 is an epicyclic or planet gear of the differential gear 13,
30 is a planet carrier of the differential gear 13,
31 is an annular gear wheel of the differential gear 13.

As shown, the adjustable converter 15 preferably has a stationary shell 15a, in which the centripetally traversed (flowed-through) guide blades 27a are tiltably positioned in a manner that is known. The pump impeller 25 and the turbine wheel 26 as shown are preferably traversed centrifugally. In FIG. 1 the turbine wheel 26 is connected directly to the differential gear 13 by means of the override shaft 16; i.e., there is no step-up or step-down gear in the override branch. In this case it is advantageous to connect the three gear components 28, 30 and 31 of the differential gear 13 as follows with the remaining system elements: The sun wheel 28 is connected with the override shaft 16, the planet carrier 30 is connected with the output shaft 14 and the annular gear wheel 31 is connected with the intermediate shaft 12.

In FIG. 2 a constant ratio planetary gearing 19 is disposed between the adjustable converter 15 and the differential gear 13 preferably between brake 17 and gear 13. Therefore, the sun wheel 28 of the differential gear 13 is now coupled to the output shaft 14, the planet carrier 30 is coupled to the intermediate shaft 12 and the annular gear wheel 31 is coupled to the annular gear wheel 32 of the constant ratio planetary gearing 19. The latter has planet (epicyclic) gears 33 rotate on a planet carrier 34 that is fixed to the housing. A sun wheel 35 of gearing 19 is connected to the override shaft 16.

Whereas in FIG. 2 the constant ratio planetary gearing 19 has simple planet (epicyclic) gears 33, which mesh with the annular gear wheel 32 as well as with the sun wheel 35, in FIG. 3 the following is provided: Here the constant ratio planetary gearing 19 has double planets 33', the wheel halves of which have different diameters. The smaller wheel half meshes with the annular gear wheel 32 and the larger wheel half with the sun wheel 35. This arrangement serves to achieve a greater speed reduction between the sun wheel 35 and the annular gear wheel 32. This is desired because in FIG. 3, in contrast to FIG. 2, the annular gear wheel 31 of the differential gear 13 is connected to the intermediate shaft 12 and the planet carrier 30 is connected to the annular gear wheel 32 of the constant ratio planetary gearing 19.

A particularly desirable feature of the power transmission systems of FIGS. 1-3 is the coaxial placement sequence of the system elements. Thus, as taken from the input, first input shaft 10, then hydrodynamic coupling 11, hydrodynamic torque converter 15, brake 17, differential gear 13 ad lastly output shaft 14. In this respect the override shaft 16 is hollow and encloses the intermediate shaft 12. The pump impeller 25 is permanently coupled to the intermediate shaft 12.

An alternative to the arrangement described with reference to FIGS. 1-3 arises when the hydrodynamic coupling 11 is omitted. In such case there is also no by-pass coupling 18 and the intermediate shaft 12 also serves as the input shaft.

In normal continuous operation power transmission occurs via the hydrodynamic coupling 11 or the by-pass coupling 18 when the adjustable converter 15 has been emptied and the brake 17 is switched on. The override shaft 16 then rotates backwards at a low rotational speed. When working with the hydrodynamic coupling 11 (i.e., when the by-pass coupling 18 is disengaged) the negative rotational speed of the override shaft 16 can be adjusted—preferably in an upper part of the lower rotational speed range—by varying the degree of admission of fluid to the hydrodynamic brake 17 so that the hydrodynamic coupling 11 works with as little slip as possible, i.e., almost without loss. The filling degree in brake 17 may be controlled by adjusting an outlet valve 17a in the fluid path.

In other words, the coupling 11 works at a maximum degree of filling of fluid, rate of admission, with the scoop pipe 24 being adjusted to zero fluid delivery, so that losses in an outer fluid circuit of coupling 11 are mainly or completely avoided. If the output shaft 14 is to rotate at an increased speed, i.e., in the upper rotational speed range, then the converter 15 is filled and the brake 17 is switched off by emptying. In such case, it is also expedient to switch on the by-pass coupling 18 so that the converter pump impeller 25 rotates at the rotational speed of the input shaft 10. In each case two parallel power paths are now effective, whereby the converter 15 transmits a part of the total output to the differential gear 13, while the remaining larger share of the output is supplied via the normal power path as described above.

If in FIGS. 1 to 3 the by-pass coupling 18 is omitted, then it is expedient not to couple the converter pump impeller 25 to the intermediate shaft 12, but to the coupling shell 23 rotating with the input shaft 10. In FIGS. 1 to 3 the entire hydrodynamic coupling 11 including the by-pass coupling 18 can also be omitted if necessary; for example, in the case when a turbo-compressor is to be driven with a rotational speed which is varied only in the upper rotational speed range and remains constant below this speed range.

In certain circumstances it is necessary to adapt the power transmission system according to the invention to a relatively slowly rotating prime mover. For this purpose in accordance with FIGS. 4 and 5 the input shaft 10 may be connected via a step-up gear 41 to a staggered or laterally displaced drive shaft 40. The step-up gear 41 has a pinion 42 mounted on input shaft 10 and a large gear 43 mounted on the drive shaft 40. In this case it is expedient to dispose bearings 44 for input shaft 10 on both sides of the pinion 42. The arrangement of the system elements in FIG. 4 involve hollow input and intermediate shafts 10, 12 which enclose the override shaft. The system advantageously places the respective elements in the axial sequence as shown.

According to FIG. 5 the output shaft 14 can be connected via an output gear 45 with a laterally displaced driven shaft 49. The gear wheels of this gear 45 are designated by 46 and 47 and the bearings used to mount the output shaft 14 by 48. FIG. 5 shows an exemplified embodiment in which both an input step-up gear 41 and also an output gear 45 are provided. The arrangement shows the system elements in a desirable axial sequence with a hollow input shaft that encloses the intermediate shaft 12. If necessary, in the embodiment of FIG. 5 the step-up gear 41 can be omitted and the hydrodynamic coupling 11 can be driven directly via an externally disposed coaxial input shaft 10, similarly as in FIGS. 1 to 3.

What is claimed is:

1. In a power transmission system for driving a variable speed processing machine, and having system elements comprising:
   (a) a shaft (12) that is coupled to a first gear component of a differential gear (13); and wherein
   (b) a second gear component of said differential gear (13) is permanently coupled to an output shaft (14); and wherein
   (c) a third gear component of said differential gear (13) is coupled by means of an override shaft (16) to a hydrodynamic brake (17) coaxially disposed with respect to said override shaft (16) for retarding the latter shaft and to a turbine wheel (26) of a fillable and emptiable and controllable hydrodynamic torque converter (15), so that said output shaft may be rotated in a lower speed range when said brake (17) is effective and when said torque converter (15) is emptied and may be rotated in an upper speed range when said brake (17) is released and when said torque converter (15) is filled; and wherein
   (d) a constant step-up or step-down gearing (19) comprising a constant ratio coaxial planetary gearing is disposed in series between said turbine wheel of said torque converter (15) and the third gear component of said differential gear (13),
   wherein all of said shafts (12; 14; 16) and said differential gear (13), said constant step-up or step-down gearing (19) and said hydrodynamic torque converter (15) are coaxially disposed with respect to one another.

2. The power transmission system of claim 1 wherein said constant step-up or step-down gearing (19) is mounted axially between said brake (17) and said differential gear (13).

3. The power transmission system of claim 2 wherein said hydrodynamic brake (17) has means for setting different fluid filling degrees.

4. The power transmission system of claim 1 wherein said override shaft (16) comprises a hollow shaft mounted to enclose said shaft (12).

5. In a power transmission system for driving a variable speed processing machine, and having system elements comprising:
   (a) a shaft (12) that is coupled to a first gear component of a differential gear (13) wherein said shaft (12) is formed as an intermediate shaft and is coupled via a controllable hydrodynamic coupling (11) to an input shaft (10); and wherein
   (b) a second gear component of said differential gear (13) is permanently coupled to an output shaft (14); and wherein
   (c) a third gear component of said differential gear (13) is coupled by means of an override shaft (16) to a hydrodynamic brake (17) coaxially disposed with respect to the override shaft (16) for retarding the latter shaft and to a turbine wheel (26) of a fillable and emptiable and controllable hydrodynamic torque converter (15), so that said output shaft may be rotated in a lower speed range when said brake (17) is effective and when said torque converter (15) is emptied and may be rotated in an upper speed range when said brake (17) is released and when said torque converter (15) is filled,
   wherein all of said shafts (10; 12; 14; 16) and said differential gear (13) and said hydrodynamic torque converter (15) are coaxially disposed with respect to one another.

6. The power transmission system of claim 5 which further comprises means for setting different fluid filling degrees in said hydrodynamic brake (17).

7. The power transmission system of claim 5 wherein said hydrodynamic coupling (11) is coaxial with respect to said input shaft (10), said hydrodynamic torque converter (15), said brake (17), said differential gear (13) and said output shaft (14).

8. The power transmission system of claim 7 wherein said override shaft (16) is a hollow shaft mounted to enclose said shaft (12).

9. The power transmission system of claims 5 wherein said hydrodynamic coupling (11) has a mechanical by-pass coupling (18) disposed in parallel therewith.

10. The power transmission system of claim 9 which further comprises a pump impeller (25) permanently coupled to said shaft (12) as part of said hydrodynamic torque converter (15).

11. In a power transmission system for driving a variable speed processing machine, and having system elements comprising a three-component differential gear (13) having first, second and third gear components, said system elements further comprising:
   (a) a shaft (12) that is coupled for transmitting torque to the first gear component of said differential gear (13); and wherein
   (b) the second gear component of said differential gear (13) is permanently coupled to an output shaft (14); and wherein
   (c) the third gear component of said differential gear (13) is coupled by means of an override shaft (16), which is a hollow shaft mounted to enclose said shaft (12), to a hydrodynamic brake (17) for retarding the latter shaft and to a turbine wheel (26) of a fillable and emptiable and controllable hydrodynamic torque converter (15) comprising a pump impeller (25), said turbine wheel (26), and a set of guide blades (27a) which are positioned in a stationary converter shell (15a), so that the output shaft may be rotated in a lower speed range when said brake (17) is effective and when said torque converter (15) is emptied and may be rotated in an upper speed range when said brake (17) is released and when said torque converter (15) is filled,
   wherein all of said shafts (12; 14; 16) and said differential gear (13), said hydrodynamic torque converter (15) and said hydrodynamic brake (17) are coaxially disposed with respect to one another.

12. The power transmission system of claim 11 which further comprises means for setting different fluid filling degrees for said hydrodynamic brake (17).

* * * * *